(12) United States Patent
Samadani et al.

(10) Patent No.: US 11,881,096 B2
(45) Date of Patent: Jan. 23, 2024

(54) SYSTEM AND METHOD FOR PERFORMING MOBILITY MANAGEMENT USING HAPTIC GUIDANCE

(71) Applicant: KONINKLIJKE PHILIPS N.V., Eindhoven (NL)

(72) Inventors: Ali Akbar Ahmad Samadani, Somerville, MA (US); Portia Erin Singh, Everett, MA (US); Daniel Jason Schulman, Jamaica Plain, MA (US)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 17/120,380

(22) Filed: Dec. 14, 2020

(65) Prior Publication Data

US 2021/0192918 A1 Jun. 24, 2021

Related U.S. Application Data

(60) Provisional application No. 62/949,546, filed on Dec. 18, 2019.

(51) Int. Cl.
*G08B 21/04* (2006.01)
*H04W 4/029* (2018.01)
*G06F 3/01* (2006.01)
*H04W 4/021* (2018.01)

(52) U.S. Cl.
CPC .......... *G08B 21/043* (2013.01); *G06F 3/014* (2013.01); *H04W 4/021* (2013.01); *H04W 4/029* (2018.02)

(58) Field of Classification Search
CPC .............................. G08B 21/043; G06F 3/014
See application file for complete search history.

(56) References Cited

U.S. PATENT DOCUMENTS

| | | | | |
|---|---|---|---|---|
| 5,626,094 | A | * | 5/1997 | Jeffery ............... A62B 3/00 116/DIG. 17 |
| 9,576,460 | B2 | * | 2/2017 | Dayal .................. G08B 21/02 |
| 10,024,678 | B2 | * | 7/2018 | Moore ............... G01C 21/1656 |
| 2009/0076723 | A1 | * | 3/2009 | Moloney ............ G01C 21/3652 701/472 |

(Continued)

FOREIGN PATENT DOCUMENTS

| | | | |
|---|---|---|---|
| WO | 2015083183 A1 | 6/2015 | |
| WO | 2017197308 A1 | 11/2017 | |
| WO | WO-2017197308 A1 | * 11/2017 | ............. G06Q 10/00 |

OTHER PUBLICATIONS

International Search Report and Written Opinion, International Application No. PCT/EP2020/084566, dated Feb. 25, 2021.

(Continued)

*Primary Examiner* — Quan Zhen Wang
*Assistant Examiner* — Mancil Littlejohn, Jr.

(57) ABSTRACT

A method for managing movement includes determining a current location of a subject in a monitoring area, comparing the current location to a risk area location in the monitoring area, determining a likelihood of injury based on a result of the comparison, and generating control information based on the likelihood of injury to the subject. The control information may control activation of a haptic effect in a device worn or carried by the subject. The haptic effect may correspond to at least one stimulus that notifies the subject of the potential risk area.

20 Claims, 4 Drawing Sheets

(56) References Cited

U.S. PATENT DOCUMENTS

| | | | | |
|---|---|---|---|---|
| 2009/0292460 | A1* | 11/2009 | Kaldewey | G01C 21/383 707/E17.014 |
| 2013/0218456 | A1 | 8/2013 | Hobein | |
| 2014/0180582 | A1 | 6/2014 | Pontarelli et al. | |
| 2016/0275816 | A1 | 9/2016 | Harish | |
| 2017/0177436 | A1 | 6/2017 | Lee et al. | |
| 2017/0261334 | A1 | 9/2017 | Lee et al. | |
| 2018/0177436 | A1* | 6/2018 | Chang | A61B 5/1117 |
| 2018/0189567 | A1 | 7/2018 | Maheriya et al. | |
| 2019/0043331 | A1* | 2/2019 | Eulloqui | G01S 13/04 |
| 2019/0147173 | A1* | 5/2019 | Mai | G06F 21/604 726/26 |
| 2019/0172571 | A1* | 6/2019 | Ramaci | G16H 10/60 |
| 2020/0219620 | A1* | 7/2020 | Kochura | G08B 21/0453 |

OTHER PUBLICATIONS

Katzschmann, R., "Safe Local Navigation for Visually Impaired Users with a Time-of-Flight and Haptic Feedback Device", IEEE Transactions on Neural Systems and Rehabilitation Engineering—Jan. 2018.

Tsukada et al., "ActiveBelt: Belt-type Wearable Tactile Display for Directional Navigation", May 2007.

Dimitrios Dakopoulas et al., "Towards a 2D Tactile Vocabulary for Navigation of Blind and Visually Impaired", Proceedings of the 2009 IEEE International Conference on Systems, Man, and Cybernetics, San Antonio, TX, USA—Oct. 2009.

Administration on Aging (AoA) (2014). "A Profile of Older Americans." http://www.aoa.acl.gov/Aging_Statistics/Profile/index.aspx. Retrieved Dec. 7, 2020.

B. Ada-Helen, and L. Harper. "Fixing to stay: A national survey of housing and home modification issues." AARP, 2000.

A C. Scheffer, M J. Schuurmans, N van Dijk, T van der Hooft, S E. de Rooij. "Fear of falling: measurement strategy, prevalence, risk factors and consequences among older persons", Age and Ageing, 37(1), 2008, pp. 19-24.

W.J. Li, T.H.M. Keegan, B. Sternfeld, S. Sidney, C.P. Quesenberry, J.L. Kelsey. "Outdoor falls among middle-aged and older adults: A neglected public health problem". American Journal of Public Health, 96. 2006, pp. 1192-1200.

P.C. Dixon, K.H. Schutte, B. Vanwanseele, J.V. Jacobs, J.T. Dennerlein, J.M. Schiffman. "Gait adaptations of older adults on an uneven brick surface can be predicted by age-related physiological changes in strength". Gait & Posture, 61. 2018, pp. 257-262.

JV Jacobs. "A review of stairway falls and stair negotiation: Lessons learned and future needs to reduce injury." Gait & Posture, 49. 2016: 159-167.

* cited by examiner

SYSTEM AND METHOD FOR PERFORMING MOBILITY MANAGEMENT USING HAPTIC GUIDANCE

CROSS-REFERENCE TO PRIOR APPLICATIONS

This application claims the benefit of U.S. Provisional Application No. 62/949,546, filed on 18 Dec. 2019. This application is hereby incorporated by reference herein.

TECHNICAL FIELD

One or more embodiments described herein generally to processing information, and more specifically, but not exclusively, to performing mobility management and risk avoidance.

BACKGROUND

The aging population has grown by 28% from 2004 to 2014 (46.2 million) and is projected to grow to 82.3 million by the year of 2040. According to the American Association of Retired Persons (AARP), 90% of seniors (65+ years) prefer to age in place, e.g., stay at home instead of moving to an assisted living or nursing facility. The burgeoning older population necessitates development of technologies that enable independent and healthy aging-in-place, and especially technologies that can improve mobility and reduce mobility-related risks.

Falls are one of the principal risks to elderly people living at home, and in fact are the leading injury-related cause of death in individuals age 65 and over in the United States, according to CDC statistics. In most cases, the potential for a fall results from mobility impairment due to age-related physical decline and environmental hazards. This may lead to a wide range of negative psychological and physical outcomes. Hearing and vision impairments may only exacerbate the mobility risks. All of these factors increase lead to activity avoidance, which, in turn, adversely affects quality of life.

Current technologies focus on detection of adverse mobility events such as personal emergency response systems (PERS, e.g., Philips Lifeline®). These systems track mobility using inertial measurement unit, examples of which include accelerometers, gyroscopes, and a magnetometers. However, these systems are unable to address many concerns relating to falls or other types of risks. Moreover, these systems do not determine and warn of potential risks, nor do they provide help in guiding a person to escape such risks in order to avoid an impending injury.

SUMMARY

A brief summary of various example embodiments is presented below. Some simplifications and omissions may be made in the following summary, which is intended to highlight and introduce some aspects of the various example embodiments, but not to limit the scope of the invention. Detailed descriptions of example embodiments adequate to allow those of ordinary skill in the art to make and use the inventive concepts will follow in later sections.

In accordance with one or more embodiments, a method for managing movement, comprising determining a current location of a subject in a monitoring area; comparing the current location to a risk area location in the monitoring area; determining a likelihood of injury based on a result of the comparison; and generating control information based on the likelihood of injury to the subject, wherein the control information is to control activation of a haptic effect in a device worn or carried by the subject and wherein the haptic effect corresponds to at least one stimulus that notifies the subject of the potential risk area.

Determining the current location may include receiving one or more location signals from a corresponding number of location sensors in the monitoring area; accessing layout information corresponding to the monitoring area; comparing location information corresponding to the one or more location signals to the layout information, and determining the current location of the subject based on a result of the comparison of the location information to the layout information. The method may include generating at least one of spatial information or movement information, wherein the spatial information indicates a distance between the current location of the subject and the risk area location and wherein the movement information indicates at least one of a direction of movement of the subject, a time of movement of the subject, or a speed of movement of the subject, and wherein the likelihood of injury is determined based on at least one of the spatial information or the movement information.

The control information may indicate at least one of a type of a haptic actuator in the device, a pattern of activation of the haptic actuator, a duration of activation of the haptic actuator, or a time of activation or deactivation of the haptic actuator. The method may include accessing haptic information correlating different types of haptic effects to different likelihoods of injury, wherein the control information is generated based on the haptic information. The risk area location may include a set of stairs. The control information may controls activation of the haptic effect to alert the subject of a remaining number of steps when the subject is on the set of stairs.

In accordance with one or more embodiments, an apparatus for managing movement includes a memory configured to store instructions and a processor configured to execute the instructions to: determine a current location of a subject in a monitoring area; compare the current location to a risk area location in the monitoring area; determine a likelihood of injury based on a result of the comparison; and generate control information based on the likelihood of injury to the subject, wherein the control information is to control activation of a haptic effect in a device worn or carried by the subject and wherein the haptic effect corresponds to at least one stimulus that notifies the subject of the potential risk area.

The processor may determine the current location by receiving one or more location signals from a corresponding number of location sensors in the monitoring area; accessing layout information corresponding to the monitoring area; comparing location information corresponding to the one or more location signals to the layout information, and determining the current location of the subject based on a result of the comparison of the location information to the layout information.

The processor may generate at least one of spatial information or movement information, wherein the spatial information indicates a distance between the current location of the subject and the risk area location and wherein the movement information indicates at least one of a direction of movement of the subject, a time of movement of the subject, or a speed of movement of the subject, and wherein the likelihood of injury is determined based on at least one of the spatial information or the movement information. The control information may indicate at least one of: a type of a haptic actuator in the device, a pattern of activation of the haptic actuator, a duration of activation of the haptic actuator, or a time of activation or deactivation of the haptic actuator.

The processor may access haptic information correlating different types of haptic effects to different likelihoods of injury, wherein the control information is generated based on the haptic information. The risk area location may include a set of stairs. The control information may control activation of the haptic effect to alert the subject of a remaining number of steps when the subject is on the set of stairs. The apparatus may include one or more actuators to generate the at least one stimulus. The apparatus may be included in a device carried or worn by the subject.

In accordance with one or more embodiments, a computer-readable medium stores instructions for causing a processor to: determine a current location of a subject in a monitoring area; compare the current location to a risk area location in the monitoring area; determine a likelihood of injury based on a result of the comparison; and generate control information based on the likelihood of injury to the subject, wherein the control information is to control activation of a haptic effect in a device worn or carried by the subject and wherein the haptic effect corresponds to at least one stimulus that notifies the subject of the potential risk area.

The computer-readable medium may store instructions to cause the processor is to determine the current location by: receiving one or more location signals from a corresponding number of location sensors in the monitoring area; accessing layout information corresponding to the monitoring area; comparing location information corresponding to the one or more location signals to the layout information, and determining the current location of the subject based on a result of the comparison of the location information to the layout information.

The computer-readable medium may store instructions to cause the processor to: generate at least one of spatial information or movement information, wherein the spatial information indicates a distance between the current location of the subject and the risk area location and wherein the movement information indicates at least one of a direction of movement of the subject, a time of movement of the subject, or a speed of movement of the subject, and wherein the likelihood of injury is determined based on at least one of the spatial information or the movement information. The control information may indicate at least one of: a type of a haptic actuator in the device, a pattern of activation of the haptic actuator, a duration of activation of the haptic actuator, or a time of activation or deactivation of the haptic actuator.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate example embodiments of concepts found in the claims and explain various principles and advantages of those embodiments.

These and other more detailed and specific features are more fully disclosed in the following specification, reference being had to the accompanying drawings, in which.

DETAILED DESCRIPTION

Figure 1:
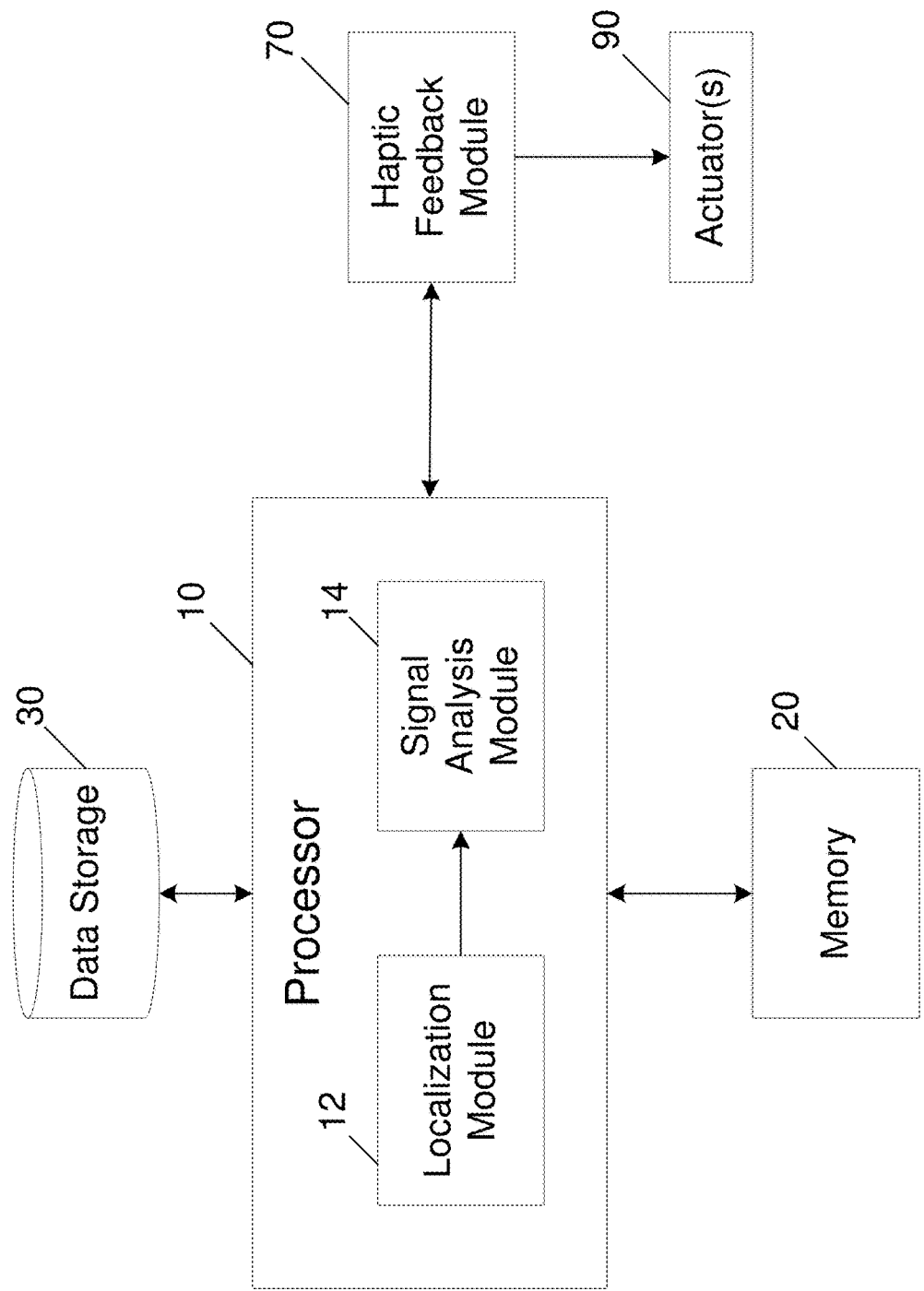
FIG. 1 illustrates an embodiment a system for performing mobility management of a subject using haptic guidance.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various example embodiments described herein are not necessarily mutually exclusive, as some example embodiments can be combined with one or more other example embodiments to form new example embodiments. Descriptors such as "first," "second," "third," etc., are not meant to limit the order of elements discussed, are used to distinguish one element from the next, and are generally interchangeable. Values such as maximum or minimum may be predetermined and set to different values based on the application.

Example embodiments include a system and method for performing mobility management of a subject using haptic guidance. In one implementation, the system and method may determine the existence of one or more risk areas in a monitoring area of a subject and then control activation of one or more haptic responses. The haptic responses may inform or warn the subject of the existence of the risk area(s) and/or guide the subject away from or through the risk area(s). Such a system may be used by anyone for a variety of applications, but may be especially beneficial for the elderly who have limited mobility, persons with mental or physical disabilities, people who are blind or have some form of vision impairment, or people who are deaf or have another form of hearing impairment.

The haptic responses may be produced by one or more actuators in a device worn or carried by the subject. When activated, the actuator(s) generate a perceptible or tactile stimulus that warns the subject of a potential risk area, and in some embodiments also guide the subject away from the risk area in order to avoid injury. These features may be accompanied by voice-command input and/or output operations that increase the convenience and effectiveness of mobility management. In one implementation, haptic responses may be generated in order to guide a person to a desired location along a route that avoids risk areas.

FIG. 1 illustrates an embodiment of a system for performing mobility management of a subject using haptic guidance. The subject may be any type of person, but the embodiments described herein are especially beneficial for persons who are elderly, mentally or physical handicapped, hearing impaired, and vision impaired, as well as others who may have issues with mobility and therefore are prime candidates for fall or other types of mobility, personal, and environmental injury risks. In some cases, the embodiments may assist persons of younger age who are able to understand the warnings generated for impending risks and change behavior in accordance with the haptic guidance.

Referring to FIG. 1, the system includes a processor 10, a memory 20, and a data storage 30. The processor performs management and control operations of the system, along with retrieval, storage, and processing of information stored in the data storage area. The memory 20 stores instructions for controlling the processor to perform operations described herein. The instructions may be, for example, embodied as an application on a device, control program of a system processor, or another form of code or software for managing the mobility of a subject to be monitored, depending on the intended implementation of the system. The data storage area 30 may be located in the same device as the processor 10 or may be coupled to the processor 10 through a communication link or network. The data storage area may be embodied in a variety of forms, including but not limited to a database or memory device.

The processor 10 may include a localization module 12 and a signal analysis module 14, in this embodiment. The localization module may determine a current location of a subject to be monitored relative to the location(s) of one or more features that are in the vicinity of the subject. In one example embodiment, the localization module 12 may receive signals from one or more beacons (or other location signal transmitting devices) set at predetermined locations throughout the vicinity where risk areas may be present. Examples of these risks include steps or stairs, protruding objects, floor hazards, clutter, furniture, house fixtures, and/or other objects that may present a mobility risk in the monitoring area. The monitoring area may include indoor and/or outdoor locations. Examples of indoor locations include a house, apartment, work environment, office, classroom, or other place where the subject is active, a fall may occur, or a mobility risk is present. Examples of outdoor locations include a yard, path, street, ditches, curbs, water, or other places where a fall may occur or which otherwise may present a risk of injury.

In order to determine the location of the subject, the localization module 12 may receive signals from one or more sources. The sources may include one or more sensors that generate signals indicative of the location or movement of the subject. Examples of the sensors include accelerometers (e.g., carried on the patient) and pressure sensors, for example, located on the stairs that generate signals to track the steps of the subject on stairs. Other sources that generate location or movement signals (collectively referred to as location signals) include barometers and indoor localization technologies. The indoor localization technologies include camera systems, motion detectors, RFID or tag technologies, various types of beacon systems (e.g., RF, Wi-Fi, Bluetooth, server-based, or other types of beacons), and other types of tracking or navigation systems. Examples of the beacon systems include Apply iBeacon and Google Beacon Platform (Eddystone google)).

Outdoor localization technologies include GPS, location information generated from mobile communications systems, RF-based systems, camera systems, and other types of outdoor tracking and navigation systems. In one embodiment, a combination of the aforementioned indoor and outdoor location technologies. For example, barometers along with accelerometers may be used to detect movement of a subject ascending and descending a stair case, stair-by-stair. The location signals may be pre-processed by the localization module 14 to remove noise and other spurious signals for improved location determination.

Figure 2:
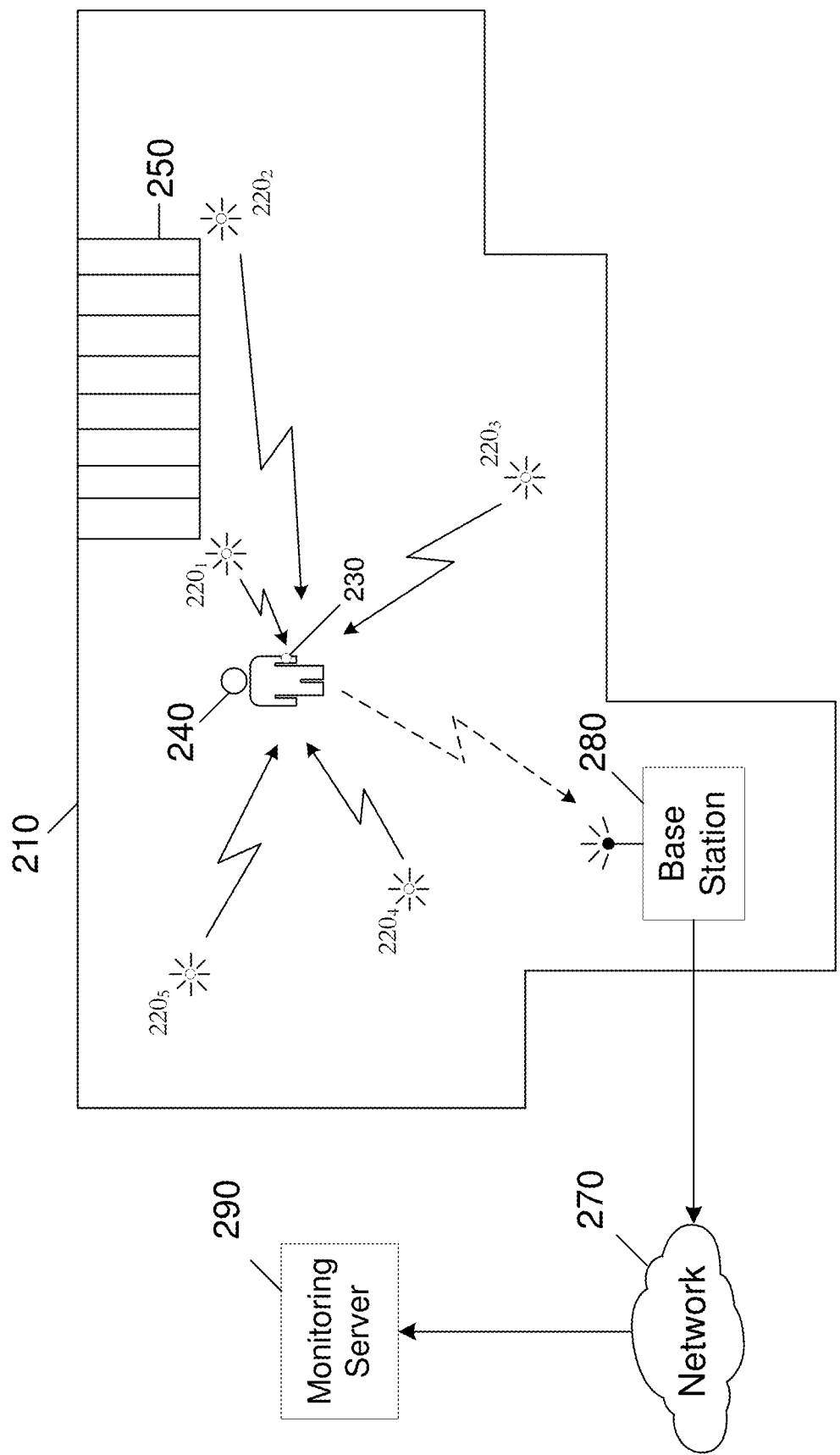
FIG. 2 illustrates an example of a monitoring area for the subject.

FIG. 2 illustrates an example of a monitoring area that includes risk areas. In this example, the monitoring area includes a layout 210 indicated by information stored in the data storage area 30. The layout information may serve as a frame of reference for, one, processing the location signals to determine the current location of the subject in the monitoring area and, two, indicating the location(s) of one or more risk area(s) in the monitoring area. In one embodiment, other areas of interest (e.g., ones different from risk areas, including but not limited to certain rooms in a house, a telephone, or another feature or object). In addition to a floor plan, the layout information may indicate the size, perimeter, contents, and/or other features of interest in the living environment of the subject.

The risk area(s) indicated in the layout information may correspond to positions of location sensors $220_1$ to $220_5$ arranged throughout the monitoring area. In this example, signals generated from the location sensors are sent to a wearable device 230 on the subject 240 to be monitored. The wearable device is depicted as a watch-based device that receives the location signals for generating at least one haptic response, in a manner to be discussed in greater detail below. In one embodiment, the watch may bidirectionally communicate with the location sensors for purposes of controlling the activation, operational mode, or parameters of those sensors. In FIG. 2, the layout 210 of the monitoring area of the subject includes risk areas identified by five location sensors $220_1$ to $220_5$, two of which mark respective ends of a set of stairs 250, which may present a fall risk for the subject.

The layout information stored in the data storage area 30 may be used as a basis for controlling the activation or deactivation of one or more of the location sensors under predetermined circumstances, e.g., at different times of the day, when the subject is detected to be at home (e.g., as determined, for example, by motion sensors), or when other conditions have been satisfied. Thus, in these cases, placement of the location sensors may depend on not only the presence of certain hazardous areas or objects (e.g., stairs) in the monitoring area, but also certain temporal patterns or physical characteristics of the subject. These temporal patterns or physical characteristics may be taken into consideration (e.g., programmed into the control software of the system) for purposes of activating or deactivating the location sensors at different times. One example relates to falls, e.g., falls might be more common in the morning due to the prevalence of hypotension in the morning time. This may be taken into account when designing or determining the placement of the location sensors, and when determining a schedule for selectively activating certain ones of the location sensors.

As an additional example, consider the case of a subject who has a chronic condition. Storing information corresponding to the chronic condition (e.g., in a user profile accessible by the processor 10) may serve as a basis for creating a more user-aware early warning system. For example, subjects with Alzheimer's disease may be more prone to falls in the evening due to sundowning syndrome. In this case, processor 10 may automatically activate the location sensors in the evening. In one implementation, the entire system may be automatically activated in the evening and deactivated at other times, given the condition(s) of the subject to be monitored and/or other circumstances programmed into the control instructions of the system.

In another embodiment, a subject profile may contain information on the type and schedule for medications they are taking. The data storage (30) stores a mapping between medications and different side effects including those effecting subject's mobility and balance. Using this knowledge, the system may then activate and start monitoring the user and provide haptic mobility guidance following intake of medications, depending on the side effects and their durations. In another embodiment, subject's behavioral patterns e.g., the toileting pattern at night-time, may be stored in subject's profile and used to determine subject's intention and guide the subject via haptic feedback to the bathroom in the dark once awakening followed by mobility are detected during night-time. The processor 10 of the system may be incorporated into the wearable device 230 or may be integrated into a monitoring controller in or remotely located from the monitoring area. For example, such a monitoring controller may be located in a base station 280 (e.g., computer, smartphone, etc.) which receives the signals directly from the location sensors or indirectly through the wearable device. In one embodiment, the base station may send the signals from the location sensors through a network 270 to a monitoring server 290 which includes the processor 10 for performing operations of the system. When the processor performs selective control, the processor 10 may selectively control activation and deactivation of the location sensors automatically according to a programmed schedule or based on sensing the presence of the subject in the monitoring area and/or at least partially based on a control signal generated by the subject, a caregiver, or another party.

In one embodiment, the data storage area 30 may store information (e.g., in a user profile) indicative of prior mobility incidents and/or historical environmental hazards relating to the subject and/or the layout. This data may then be used by the processor 10 to develop a model that can determine whether the subject is approaching a particular high-risk area in the layout (e.g., hazard area) for the subject and/or predict a deterioration in mobility or other impairments of the subject. The deterioration may be the result of seasonal or other types of transient declines in the condition of the subject or declines resulting from a change or permanent worsening of the condition. A deterioration in the condition of the subject may, in turn, prompt a change in the activation/deactivation schedule of the location sensors and/or warrant placement of additional sensors at locations that were once considered safe but now hazardous because of a worsening of the condition of the subject.

Once the location signals have been received from the location sensors, the localization module 12 may process those signals to determine the location of the subject in the monitoring area. The type of processing performed may depend on the type(s) of location sensors used. For example, when the location signals are received from a set of beacons, the localization module 12 may implement a triangulation algorithm to determine the current location of the subject (which location may change as the subject moves) and then compare that current location to the layout information. This comparison may then provide an indication of the location of the subject within the layout indicated by the layout information, as illustrated, for example, in FIG. 2. In another embodiment, pressure sensors embedded in the stairs may be used to determine the location of the subject in the staircase. In another embodiment, accelerometer and barometer signals may be used to determine the direction, speed, and altitude of the subject, hence determining whether the subject is climbing or descending the stairs. This information combined with the layout of environment may be used to determine the exact location of the subject on the staircase. Furthermore, a subject-specific mapping between sensor signals and subject's location can be learned for every new subject. In this embodiment, the system is configured for every new subject by collecting test location data from deployed location sensors and mapping them to the exact subject location conditioned on the layout of the environment. The resulting mapping may then be used to determine the location of subject using data streams from location sensors. This mapping may be in the form of a regression model. For example a model may be learned to determine the location of the subject on a staircase y(t)=f ($x_1(t)$, $x_2(t)$, ..., $x_n(t)$), where y(t) is the location of subject at time t, and $x_n(t)$ is the value of nth datastream (e.g., barometer's reading) at time t. A Kalman filter model, or variants of a Kalman filter model, may be used to implement such a location model.

Once the current location of the subject is determined within the layout of the monitoring area, that location may then be compared to the locations of a respective number of predetermined risk areas in the layout. This comparison may involve, for example, determining the proximity of the subject relative to the risk areas in terms of distance, time, direction of movement, speed of movement, and/or some other measure of the location of the current location of the subject relative to the one or more risk areas. Once this information has been determined, the signal analysis module 14 may determine the appropriate haptic response for guiding or warning the subject on a real-time basis. In addition to determining location, the localization module 12 may process the location signals and the layout information to track the movement of the patient in real-time.

When the localization module 12 determines that the current location of the subject is on a set of stairs, the movement of the subject up or down the stairs may be tracked by comparing changes in the location signals with the layout information. The location signals may include, for example, beacon or motion detector signals, signals from the pressure sensors on respective ones of the steps, or a combination of both kinds of location signals. In this case, the layout information may indicate that the set of stairs has ten steps. The location signals may be compared to the layout information to determine precisely which step the subject is currently on, whether the subject is going up or down the steps, how many steps the subject has already passed, and the number of remaining stairs (NRS) the subject has to go before he reaches the end of the stairs.

The signal analysis module 14 may generate signals for providing haptic guidance to the subject based on the information output from the localization unit 12 indicating the current location of the subject relative to the one or more risk areas. The signal analysis module may perform this operation, for example, by classifying the probabilities for injury associated with the risk areas based on the current location of the subject relative to the locations of those risk areas. In one implementation, the probabilities may be determined, for example, not only based on the current location of the subject, but also the distance between the current location and one or more risk areas, direction of movement, rate of movement, types of risk areas, disabilities or diseases of the subject, and/or other personal information stored in a user profile for the subject. A logistic regression model (feature-based model) may be learned to map between subject information (e.g., current location, rate and direction of movement, mental and physical conditions) and probability of risks. Alternatively, a model that directly captures temporal progression of data streams from sensors such as a gated recurrent neural network (temporal model) may be used. A hybrid model combining a temporal model and a feature-based model may also be used that receives sequences of data streams from sensors along with information on subject profile (e.g., current location, rate and direction of movement, mental and physical conditions, fall history, medical conditions, time of the day, seasonality information) and estimates corresponding risk probabilities.

The signal analysis module (14) uses the estimated risk probabilities to trigger a signal for providing haptic guidance from among a set of predefined haptic feedbacks. This may be implemented by methods including expert-authored rules (e.g. risk probabilities above/below a threshold). In one embodiment, the likelihood or severity of injury for one or more of the risk areas may be determined without calculating formal probabilities, but rather determining into which one of a plurality of predetermined ranges the distance and/or direction of movement of the subject is categorized. Examples of these ranges are provided below. In one embodiment, the signal analysis module 14 may generate signals for triggering at least one haptic response as the subject is approaching a hazard area but before he actually reaches that area. In this case, the haptic response(s) triggered by the signals serve as an early warning to the subject to proceed with caution or not to continue in the same direction. In the case of stairs, the signal analysis module 14 may generate signals for triggering a haptic response that alerts the subject (1) that he is entering the stairs, (2) which step he is currently one, (3) how many remaining steps are left, and (4) that he is on the last step or has left the stairs.

Once the severity or likelihood of injury is determined, the signal analysis module 14 determines the haptic response that corresponds to that severity or likelihood. This determination may be made, for example, based on information stored in data storage area 30, which maps different levels or types of severities and/or likelihoods of injury to different corresponding haptic responses. Such a correspondence may be stored, for example, in the form of a table or other arrangement. Examples of tables are provided and discussed in greater detail below.

In another embodiment, the signal analysis module (14) may directly map between subject state (sensor data streams, subject profile) and a set of pre-defined haptic feedbacks (e.g., two short vibratory feedback indicating of two steps left to the floor). The mapping may be learnt using a logistic regression or similar statistical models, structured machine learning models (e.g. gradient boosted regression trees), or sequence-based machine learning models that incorporate temporal information (e.g. hidden Markov models or recurrent neural network models).

Once the haptic response is determined, the signal analysis module 14 generates information for controlling the generation of the haptic response(s) on the device carried or worn by the subject. The device worn or carried by the subject may take various forms. For example, the device may be a wearable device including, but not limited to, a wrist-worn device such as the watch previously discussed or a fitness tracker, a chest-worn device such as the Philips Lifeline pendant, or another type of device designed to be worn on the body. In another embodiment, the device may be a smartphone, tablet, a TV remote control, a gaming controller, or other device (implemented with an associated application or as customized device) that receives signals from the processor.

In one embodiment, the signal analysis module 14 may determine haptic responses to guide the subject to, not away from an area of interest. Examples of these areas include the bathroom, kitchen, front door, thermostat location, laundry area, or another location of interest. In this case, the signal analysis module may generate signals for providing haptic guidance to guide the subject toward the feature of interest, for example, in response to a request signal generated on a control device. Examples of the control device may be a smartphone application, voice-command controller (e.g., Alexa, Google Home, etc.), a smart home feature, computer program, tablet application, or another type of device (e.g., driven by software, hardware, or both) that is configured to generate signals requesting guidance to a feature of interest in the layout.

The device carried or worn by the subject may include a haptic feedback module 70 and one or more actuators 90, as illustrated in FIG. 1. In order to generate the haptic response, the haptic feedback module 70 processes the control information generated by the signal analysis module 14. This processing may include extracting information from the signals to determine which one or combination of haptic responses are to be generated. The extracted information may identify, for example, the type of actuator(s) that is/are to be activated, the duration of activation of the actuator(s), the pattern(s) of activation, the intensity of activation, and/or other information. The pattern and/or intensity with which the one or more actuators are to be activated may convey information to the subject of, for example, how close in proximity he is to a risk area (or other area of interest) within the monitoring area. For example, in one implementation, the rate, period, and/or frequency of the haptic stimulus generated by the actuator may change (e.g., increase or decrease) as the subject moves closer and closer to the hazard area, and/or the intensity of the haptic stimulus may change (e.g., increase or decrease). Conversely, the rate and/or intensity may change in an opposite manner as the subject moves farther away from the hazard area.

In one embodiment, different actuators may be triggered under different circumstances to convey different information to the subject. For example, a first actuator may be activated when the subject is entering a set of stairs and a second actuator may be activated when the subject is traversing up or down the stairs. In this case, the actuator may generate a haptic stimulus perceptible to the subject each time the subject takes a step. In addition to the haptic response (or stimulus), the signal analysis module 14 may send control signals to the device worn or carried by the subject to provide an audible tone or verbal message of warning or other information to the subject, that may or may not accompany the haptic response from the one or more actuators.

As previously indicated, in addition to the layout information, the data storage area 30 may store mapping information (e.g., in table form) indicating one or more haptic responses or stimuli that may be generated based on the location information generated by the signal analysis module 14. The mapping information may map location and/or locomotive observations that may trigger at least one actuator to generate to one or more corresponding types of haptic feedback. In order to generate the feedback, the haptic feedback module 70 may include or access a library (e.g., stored in the data storage area 30) that stores information providing a one-to-one mapping between location/locomotive observations (indicated by signals from the signal analysis module) and predetermined haptic feedback responses.

In one embodiment, the haptic feedback module 70 may be configured to operate on a certain time of the day (only at night time) or another schedule. In these or other embodiments, the haptic feedback module may operate on demand, for example, in response to signals received by the signal analysis module 14. In this case, the signals from the signal analysis module may serve as both wake-up signals and signals containing location and/or motion information that is interpreted by the haptic feedback module to generate one or more corresponding forms of haptic response.

Table 1 sets forth one example of the mapping that may be performed in accordance with one embodiment. In this mapping, it is assumed that the device containing the haptic feedback module worn or carried by the subject has two or more actuators, each producing a different type of haptic response.

TABLE 1

| Subject Location | Actuator 1 | Actuator 2 | Actuator 3 |
| --- | --- | --- | --- |
| Steps | ON | OFF | OFF |
| Bathtub | OFF | ON | OFF |
| Shower Stall | OFF | OFF | ON |
| Non-Carpet Floor | ON | ON | OFF |
| Threshold Between Rooms | ON | OFF | ON |
| Curb Next to Mail Box | OFF | ON | ON |
| Edge of Deck | ON | ON | ON |

Table 2 shows additional information stored in the storage area that may be used as a basis for mapping haptic responses. In this example, the haptic feedback module controls a device having at least one actuator. In this case, the actuator 90 is a vibrator included in the device worn or carried by the subject being monitored. The vibrator is controlled by the haptic feedback module to generate different patterns of vibration based on the signals received from the signal analysis module 14. Each of the different patterns conveys a different type of information. In this example, the patterns vary based on proximity of the subject as he approaches a hazard area, e.g., a set of stairs.

TABLE 2

| Location from Stairs | Vibrator Pattern |
| --- | --- |
| Distance Range: 5-10 feet | Vibrating Rate: Slow Pulses |
| Distance Range: 2-5 feet | Vibrating Rate: Medium Pulses |
| Distance Range: 0-2 feet | Vibrating Rate: Fast Pulses |
| Distance Range: 0 feet | Vibrating Rate: Constant |

Figure 3:
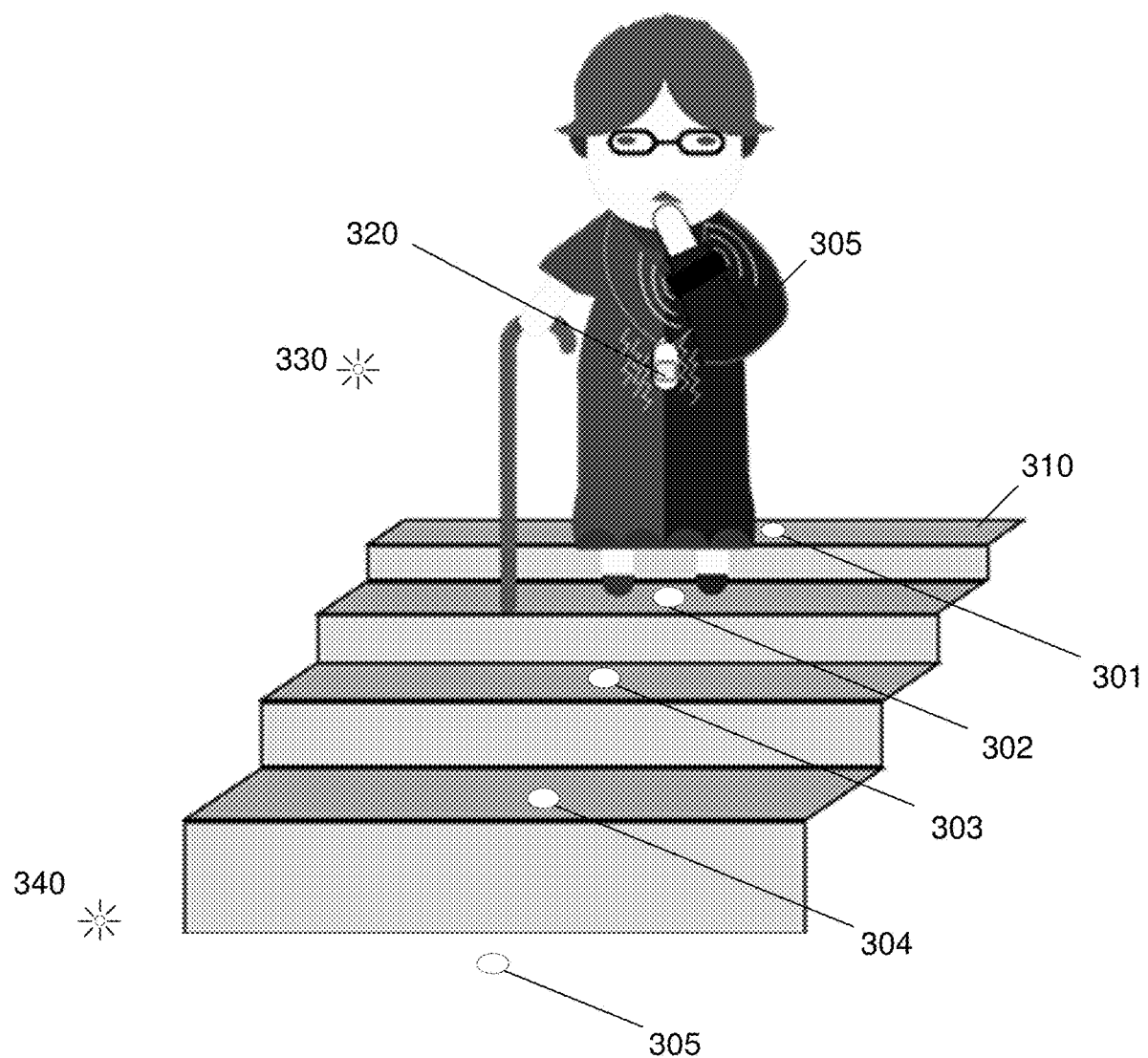
FIG. 3 illustrates an example embodiment for providing haptic guidance on stairs.

In one embodiment, additional information may be stored in the storage area 30 that may be used as a basis for mapping haptic responses. In this example, the haptic feedback module controls the performance of haptic responses in a device having at least one actuator. An example of this application is illustrated in FIG. 3, where location sensors in the form of pressure sensors 301 to 305 are positioned on respective steps of a set of stairs 310. The haptic feedback module 70 and an actuator 90 in the form of a vibrator are included in a pendant device 320 worn by the subject 305 being monitored. The vibrator is controlled by the haptic feedback module to generate a number of pulses of vibrations. The number of vibration pulses may equal the number of remaining steps (NRS) the subject has to go before she reaches the end of the stairs. Additionally, or alternatively, the device may include a speaker which announces the NRS information. In one embodiment, the pressure signals may be coupled with signals from beacons 330 and 340 at respective ends of the staircase for providing an additional indication of the position of the subject as she ascends or descends the stairs, and thus for providing one or more forms of haptic warnings or guidance.

Examples of the types of actuators that may be controlled by the haptic feedback module include, but are not limited to, ones that generate various types of pressures, forces and sound, in addition to the vibrations previously discussed. Examples of vibrators that are able to provide a haptic stimulus include eccentric rotating mass, linear resonant, or piezoelectric actuators. Smartphone, smart watches are equipped with these vibratory actuators through which the haptic responses discussed herein may be provided to and perceived by the subject.

In one embodiment, the system for performing mobility management of a subject using haptic guidance may help navigate the subject in the dark (e.g., from his bedroom to the bathroom, or from his bedroom to the kitchen in the middle of the night). In on-demand mode, the user may activate the system through a software application, e.g., by activating an application on his smartphone containing the processor (including the localization module and signal analysis module), the haptic feedback module, and one or more actuators for generating haptic response(s). In another embodiment, a pendant or other device containing the haptic feedback module (that is different from a smartphone) system may be activated for generating warnings or other applications of the haptic stimuli. For example, in a wrist-worn embodiment, a specific hand gesture (e.g., shaking the hand three times) may be linked to an activation command that activates the system including the device. In this case, if the haptic feedback module is not in the same device as the processor, then the haptic feedback module or other control logic in the device may send a signal back to activate the processor.

Figure 4:
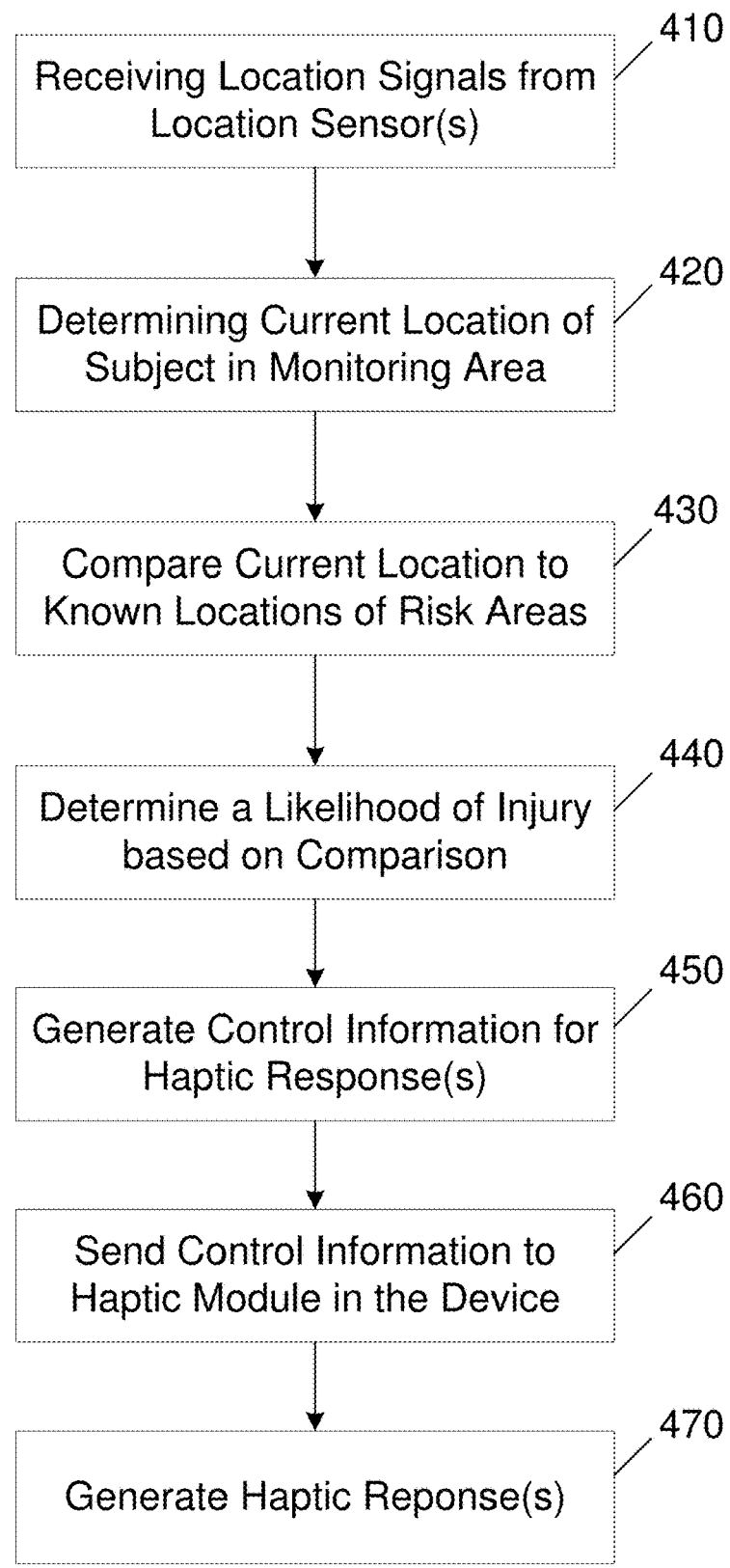
FIG. 4 illustrates an embodiment of a method for performing mobility management of a subject using haptic guidance.

FIG. 4 illustrates an embodiment of a method for performing mobility management of a subject using haptic guidance. The method may be performed by any of the system or device embodiments described herein or may be performed by a different system and/or device. For illustrative purposes, the method will be described as being performed by the system embodiments described herein.

Referring to FIG. 4, at 410, the method includes receiving, at the localization module 12, location signals from one or more location sensors. The location signals may be any of the types described herein, including ones generated from Bluetooth beacons arranged at predetermined locations corresponding to risk areas and/or other areas of interest in the monitoring area. The risk areas may include areas which pose a potential falling threat or other hazard, especially to a subject who is aged or has a movement, hearing or vision disability, or who has a chronic condition. The beacons (and/or other types of location sensors) may be near or at the area of interest. In some embodiments, multiple types of location signals may be received (e.g., beacon signals and pressure sensor signals), for example, when the area of interest includes a set of stairs. The beacons may be in a sleep or reduced power state and may be motion activated to begin transmitting location signals when the subject comes within a predetermined distance of the corresponding area.

At 420, the current location of the subject is determined within the monitoring area. The current location is determined by processing the signals from the location sensors based on layout information of the monitoring area. The type of processing that is performed may depend on the type of location sensors or signals used. For example, sensor signals generated by beacons may be input into a triangulation algorithm and then compared to the layout information to determine the current location in the monitoring area. In another case, the distance and relative position of the subject from a beacon, motion detector, camera, or other type of location sensor may be determined and used as a basis for determining the current location of the subject.

At 430, the current location of the subject is compared to the location(s) of one or more risk areas indicated in layout information. This may involve determining the distance (e.g., closeness) between the current location of the subject and the risk area and/or the degree of proximity of the current location (e.g., different distance ranges) to one or more risk areas. For example, information indicative of the locations of the risk areas may be stored in the layout information. Thus, once the current location of the subject is known, the processor 10 may calculate the distance(s) between the current location of the subject and the risk areas.

In addition to determining the current location, the direction and/or rate of movement of the subject may also be determined, for example, by comparing or tracking changes in the current location of the subject over time. The direction and/or rate of movement may provide an indication, for example, of whether the subject is approaching or leaving an area of interest, which, for example, may affect the type of haptic response generated as previously described.

At 440, the severity or likelihood of injury is determined based on the information generated in operation 430. The severity or likelihood of injury may be determined, for example, by comparing the distance between the current location of the subject and the known locations of the risk areas (or location sensors) to a table storing a correspondence between different distances and different severities or likelihood of injury. The severity or likelihood of injury may also be determined based on the direction or speed of movement of the subject, information of which may be stored in the table in association with the severity or likelihood of injury. An example of such a table is shown below. Alternatively, the severity of risk might be automatically determined using structured and learned machine learning models that map the information from 430 to different levels of likelihood of injury.

| Likelihood of Injury | Distance from Risk Area |
| --- | --- |
| None | 8 Feet |
| Low | 5 Feet |
| Medium | 3 Feet |
| High | 1 Foot |

Alternatively, instead of a severity or likelihood of risk, a mode for guiding the subject to an area of interest from his current location of the subject may be set, along with various parameters (e.g., distance to the area of interest, direction, etc.) associated with that area.

At 450, generate control information for controlling a haptic response based on the severity or likelihood of injury (or activating the guidance mode) determined in operation 440. The control information may be generated, for example, based on a correspondence or mapping defined between different levels of severity or likelihoods of injury and predetermined haptic responses. This correspondence may be stored, for example, in one or more tables in the data storage area 30 and/or in the device that includes the haptic actuator(s). In one case, the control information may be generated for controlling activation of only one actuator in the device worn or carried by the subject. In another embodiment, the control information may control activation of a plurality of actuators simultaneously or in succession, depending, for example, on the type of alert or notification that is desired to be created in the subject.

At 460, the control information for the haptic response is sent to the device worn or carried by the subject. The control information may be received and interpreted by a haptic feedback module, which, for example, may be an application, processor, or other logic in the device. The haptic feedback module processes the control information to determine (1) the type of actuator(s) to be selectively activated, (2) when to activate the actuator(s), (3) the duration of activation, (4) the intensity, frequency, or pattern of activation and/or other information relating to the haptic response that is intended to be created and perceived by the subject given the severity or likelihood of injury associated with his current location within the monitoring area. In some embodiments, a risk area is not involved but an area of interest to which the subject is to be guided. In this case, the actuator(s) may be controlled, based on control information from the signal analysis module, to generate an intended haptic response for guiding the subject to the area of interest.

At 470, the haptic feedback module generates signals for controlling the actuators in accordance with the processed control information in operation 460. Control of these actuators produces the haptic response(s) intended given the current location of the subject. In one embodiment, the processor 10 and the haptic feedback module are in the device. In other embodiments, the processor is external to the device including the haptic feedback module 70. When the processor (e.g., localization module and signal analysis module) and the haptic feedback module are in the same device, the control signals may be sent to the haptic feedback module through an internal signal path of the device. When the processor and the haptic feedback module are not in the same device, the control signals from the signal analysis module may be sent to the haptic feedback module over one or more wired and/or wireless communication links.

In one embodiment, the system and method embodiments may be interactive. For example, the subject may verbally speak information into the device indicating the location within the monitoring area of where he wants to go, e.g., "I want to go to the bathroom." A processor of the device, or the localization module, may receive and interpret the verbal statement and then provide haptic guidance (with or without voice guidance) in order to lead the subject to the bathroom. This may be accomplished by determining the current location of the subject in the monitoring area based on the location signals, comparing the current location to areas of interest (e.g., hazards, etc.) in the layout information of the monitoring area, and then guiding the subject through the layout using haptic stimuli or other forms of feedback. The guidance may be performed in various ways. For example, the haptic feedback module may activate one or more actuators on a real-time basis when the subject takes a wrong turn or pursues a wrong path leading away from the bathroom and/or towards a risk area. The verbal commands received by the device processor or localization module may use, for example, natural language processing in combination with a voice-first or voice-command device (e.g., Alexa, Google Home, etc.) to recognize the verbalized intent.

EXAMPLE SCENARIOS

Mobility-related risks are a key determinant of health and quality of life. Principal among these risks is the risk of falling, which may be divided into three broad categories of environmental risks, task-related risks, and personal risks (e.g., conditions impeding mobility such as arthritis, old age, and various types of disabilities). Embodiments described herein mitigate and control environmental and task-related risks and provide haptic guidance in helping those who with personal risks.

One of the greatest risks of injury is movement along stairs or uneven or slippery surfaces. In aging populations, stairway falls pose an especially significant risk. Individuals with vision or hearing impairments are also at an increased risk of stairway falls. Moreover, environmental factors such as dark rooms or areas with limited visibility (e.g., nighttime walks to bathroom) pose additional mobility risks. The embodiments described herein address these problems in a unique way by providing haptic guidance that serve as warnings to individuals of these risks before or as they are encountered.

The following descriptions are examples of scenarios in which one or more embodiments may help a subject navigate safely in a monitoring area. These scenarios, however, are by no means intended to be the only scenarios or applications of the disclosed embodiment.

Example 1

Scott is 85 years old and lives in a two-story building, where his bedroom is located on the second floor. Scott has vision and hearing impairments and has fallen twice in the past three months while climbing/descending the stairs. The risk of injury to Scott may be substantially reduced by using a wristband device equipped with a haptic sensor module and actuators that are controlled in accordance with the embodiments described herein. For instance, when using the stairs, the haptic feedback module may respond to signals from the signal analysis module to deliver a single short vibration to Scott's wrist, indicating that he is within one stair distance to the floor. The system may also be configured to deliver a number of short vibrations indicating the number of stairs left (e.g., 3 short vibrations indicating 3 steps left).

Example 2

Mary is 80 years old and living with dementia, and hearing impairment. Sometimes she is unable to locate the bathroom in her home. One or more embodiments described above can help guide Mary to the bathroom by generating haptic responses (in the form of directional tactile signals) using the actuators in a chest-worn pendant (or a wrist-band device) she is wearing. In this example, the directional tactile signals may be uniquely mapped to left, right, forward and backward directions. This may be accomplished, for example, by positioning four actuators at different locations on the pendant that correspond to respective ones of the directions, by pulsing or activating the actuators in different patterns that correspond to the different directions, or in other ways. Additionally, Mary may directly verbalize her intent to go to bathroom using a voice-input feature. Alternatively, the system determines Mary's intention and then directs Mary to the bathroom based on the signals output from the signal analysis module mapped with information in Mary's profile (including toileting behavior).

Another embodiment includes a computer-readable medium storing instructions for causing a processor to perform the operations of the embodiments described herein. For example, the instructions may cause the processor to determine a current location of a subject in a monitoring area, compare the current location to a risk area location in the monitoring area, determine a likelihood of injury based on a result of the comparison, and generate control information based on the likelihood of injury to the subject. The control information may control activation of a haptic effect in a device worn or carried by the subject, and the haptic effect may correspond to at least one stimulus that notifies the subject of the potential risk area. Additional instructions may be stored in the computer-readable medium to perform other operations of the system and method embodiments.

One or more embodiments described herein may include a number of additional features. For example, the system and method may be implemented using technologies similar to those used in a PERS systems or smartwatch devices. Also, an activity profile of the subject to be monitored and layout information of the living environment may be used to provide timely haptic notifications about potential hazards. In some cases, the device including the haptic feedback module and actuator(s) may be implemented on or in association with a wristband or a chest-worn device. Different haptic feedback responses may be generated for different types of risks such as climbing stairs, descending stairs, clutter, tripping hazards (e.g., loose rugs), or other objects or areas that pose a risk to injury. Risks may also change for an individual over time, as impairments and/or activity patterns change and new alerts may be configured to address the new risks.

The methods, processes, and/or operations described herein may be performed by code or instructions to be executed by a computer, processor, controller, or other signal processing device. The code or instructions may be stored in a non-transitory computer-readable medium in accordance with one or more embodiments. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

The processors, modules, units, sensors, detectors, and other information generating, processing, and calculating features of the embodiments disclosed herein may be implemented in logic which, for example, may include hardware, software, or both. When implemented at least partially in hardware, the processors, modules, units, sensors, detectors and other information generating, processing, and calculating features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the processors, modules, units, sensors, detectors, and other information generating, processing, and calculating features may include, for example, a memory or other storage device for storing code or instructions to be executed, for example, by a computer, processor, microprocessor, controller, or other signal processing device. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods herein.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media and excludes transitory signals.

Although the various exemplary embodiments have been described in detail with particular reference to certain exemplary aspects thereof, it should be understood that the invention is capable of other example embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

We claim:

1. A method for managing movement, comprising:
   determining a current location of a subject in a monitoring area by receiving one or more location signals from a corresponding number of location sensors in the monitoring area, wherein the corresponding number of location sensors are set at predetermined risk area locations throughout the monitoring area, the risk area locations each comprising an object comprising a mobility risk for the subject;
   comparing the current location to at least one of the risk area locations;
   determining a likelihood of injury associated with the at least one of the risk area locations based on a result of the comparison; and
   generating control information based on the likelihood of injury to the subject, wherein the control information is configured to control activation of a haptic effect in a device worn or carried by the subject, the haptic effect corresponding to at least one stimulus that notifies the subject of the potential at least one of the risk area locations and guides the subject out of or away from the at least one of the risk area locations.

2. The method of claim 1, wherein determining the current location includes:
   accessing layout information corresponding to the monitoring area;
   comparing location information corresponding to the one or more location signals to the layout information, and
   determining the current location of the subject based on a result of the comparison of the location information to the layout information.

3. The method of claim 1, further comprising:
   generating at least one of spatial information or movement information,
   wherein the spatial information indicates a distance between the current location of the subject and the risk area location and wherein the movement information indicates at least one of a direction of movement of the subject, a time of movement of the subject, or a speed of movement of the subject, and
   wherein the likelihood of injury is determined based on at least one of the spatial information or the movement information.

4. The method of claim 1, wherein the control information indicates at least one of:
   a type of a haptic actuator in the device,
   a pattern of activation of the haptic actuator,
   a duration of activation of the haptic actuator, or
   a time of activation or deactivation of the haptic actuator.

5. The method of claim 1, further comprising:
   accessing haptic information correlating different types of haptic effects to different likelihoods of injury, wherein the control information is generated based on the haptic information.

6. The method of claim 1, wherein the risk area location includes a set of stairs.

7. The method of claim 6, wherein the control information controls activation of the haptic effect to alert the subject of a remaining number of steps when the subject is on the set of stairs.

8. An apparatus for managing movement, comprising:
   a memory configured to store instructions; and
   a processor configured to execute the instructions to:
      determine a current location of a subject in a monitoring area by receiving one or more location signals from a corresponding number of location sensors in the monitoring area,
      wherein the corresponding number of location sensors are set at predetermined risk area locations throughout the monitoring area, the risk area locations each comprising an object comprising a mobility risk for the subject;
      compare the current location to at least one of the risk area locations;
      determine a likelihood of injury associated with the at least one of the risk area locations based on a result of the comparison; and
      generate control information based on the likelihood of injury to the subject, wherein the control information is configured to control activation of a haptic effect in a device worn or carried by the subject, the haptic effect corresponding to at least one stimulus that notifies the subject of the potential at least one of the risk areas and guides the subject out of or away from the at least one of the risk area locations.

9. The apparatus of claim 8, wherein the processor is configured to determine the current location by:
   accessing layout information corresponding to the monitoring area;
   comparing location information corresponding to the one or more location signals to the layout information, and
   determining the current location of the subject based on a result of the comparison of the location information to the layout information.

10. The apparatus of claim 8, wherein the processor is configured to:
    generate at least one of spatial information or movement information,
    wherein the spatial information indicates a distance between the current location of the subject and the risk area location and wherein the movement information indicates at least one of a direction of movement of the subject, a time of movement of the subject, or a speed of movement of the subject, and wherein the likelihood of injury is determined based on at least one of the spatial information or the movement information.

11. The apparatus of claim 8, wherein the control information indicates at least one of:
a type of a haptic actuator in the device,
a pattern of activation of the haptic actuator,
a duration of activation of the haptic actuator, or
a time of activation or deactivation of the haptic actuator.

12. The apparatus of claim 8, wherein the processor is configured to access haptic information correlating different types of haptic effects to different likelihoods of injury, wherein the control information is generated based on the haptic information.

13. The apparatus of claim 8, wherein the risk area location includes a set of stairs.

14. The apparatus of claim 13, wherein the control information controls activation of the haptic effect to alert the subject of a remaining number of steps when the subject is on the set of stairs.

15. The apparatus of claim 8, further comprising: one or more actuators to generate the at least one stimulus.

16. The apparatus of claim 15, wherein the apparatus is included in a device carried or worn by the subject.

17. A non-transitory computer-readable medium storing instructions for causing a processor to:
determine a current location of a subject in a monitoring area by receiving one or more location signals from a corresponding number of location sensors in the monitoring area, wherein the corresponding number of location sensors are set at predetermined risk area locations throughout the monitoring area, the risk area locations each comprising an object comprising a mobility risk for the subject;
compare the current location to at least one of the risk area locations;
determine a likelihood of injury associated with the at least one of the risk area locations based on a result of the comparison; and
generate control information based on the likelihood of injury to the subject,
wherein the control information is configured to control activation of a haptic effect in a device worn or carried by the subject, the haptic effect corresponding to at least one stimulus that notifies the subject of the potential at least one of the risk area locations and guides the subject out of or away from the at least one of the risk area locations.

18. The non-transitory computer-readable medium of claim 17, further storing instructions to cause the processor is configured to determine the current location by:
accessing layout information corresponding to the monitoring area;
comparing location information corresponding to the one or more location signals to the layout information, and
determining the current location of the subject based on a result of the comparison of the location information to the layout information.

19. The non-transitory computer-readable medium of claim 17, further storing instructions to cause the processor to:
generate at least one of spatial information or movement information,
wherein the spatial information indicates a distance between the current location of the subject and the risk area location and wherein the movement information indicates at least one of a direction of movement of the subject, a time of movement of the subject, or a speed of movement of the subject, and wherein the likelihood of injury is determined based on at least one of the spatial information or the movement information.

20. The non-transitory computer-readable medium of claim 17, wherein the control information indicates at least one of:
a type of a haptic actuator in the device,
a pattern of activation of the haptic actuator,
a duration of activation of the haptic actuator, or
a time of activation or deactivation of the haptic actuator.

* * * * *